Aug. 7, 1962 R. M. A. BARON 3,048,722
INTERFERENCE SUPPRESSOR FOR ELECTRICAL APPARATUS
Filed Aug. 3, 1959 2 Sheets-Sheet 2

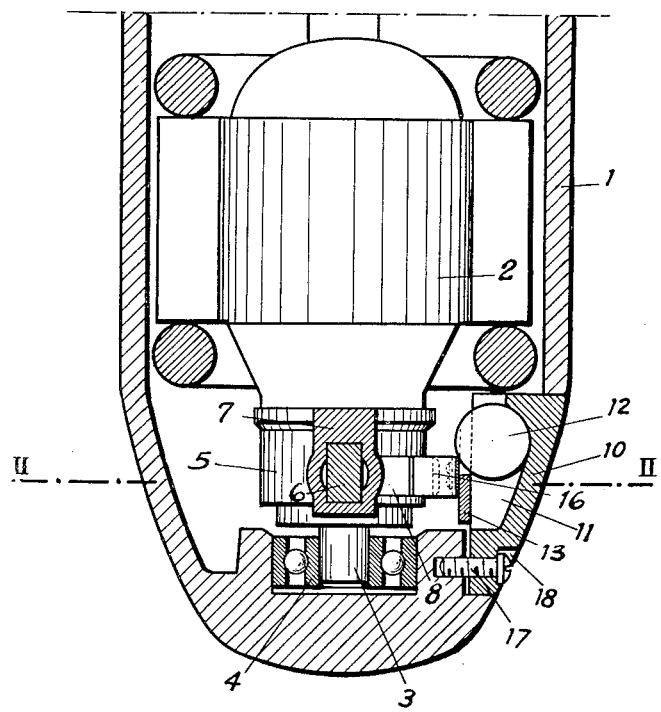
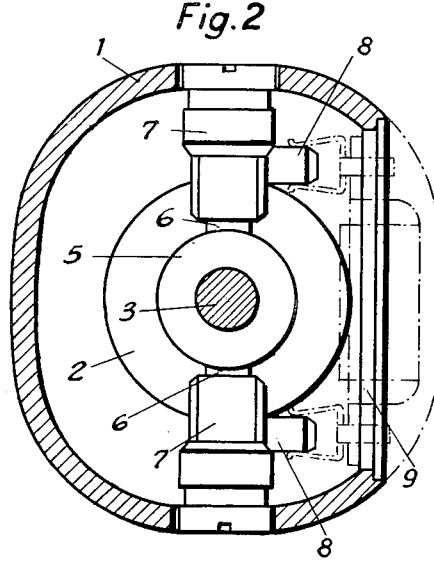
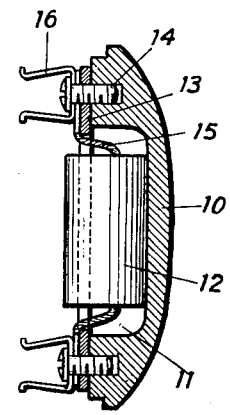

Inventor
Raoul Marie Amédée Baron
BY
Michael S. Striker
Attorney

United States Patent Office 3,048,722
Patented Aug. 7, 1962

3,048,722
INTERFERENCE SUPPRESSOR FOR ELECTRICAL APPARATUS
Raoul Marie Amédée Baron, Paris, France, assignor to Outillage Electrique Silex, Bagnolet, France
Filed Aug. 3, 1959, Ser. No. 831,360
Claims priority, application France Aug. 29, 1958
8 Claims. (Cl. 310—72)

This invention relates to interference suppressors for electrical apparatus comprising an electric motor, especially portable electric tools, such as electric drills, saws, and the like.

Suppressors usually take the form of capacitors or inductances, or both, inserted at various positions in the electric circuit of the motor or incorporated in the body of the latter. The way in which suppressors have been thus connected hitherto has been disadvantageous for a number of reasons.

The machines usually have to be submitted to a dielectric test which generally consists in applying a voltage of the order of 1500 volts for about a minute. This high voltage causes a premature aging of the condensers and sometimes causes them to be put out of service. The replacing of the faulty suppressor is a delicate operation and can be done only by a skilled operator. Moreover, in certain cases it is necessary to utilise, if only temporarily, a machine in which the motor is not suppressed and this again necessitates a special dismantling operation. Finally the connections to the suppressor are of appreciable length and they act as an antenna which radiates interference waves. This is obviously a considerable disadvantage.

All these disadvantages are overcome by the present invention, according to which there is provided a readily detachable interference suppressing unit comprising a cover plate capable of being detachably secured to the housing of the electric machine and carrying a suppressor connected to electric contacts which are adapted to engage electrically with the brush-holders of the electric motor within the housing when the cover plate is placed in position over an aperture formed in this housing.

The following description with reference to the accompanying drawings (the latter being given by way of example and being in no way limitative) will illustrate the particular features of the invention and the method of putting them into practice, any arrangement comprised in the description or in the drawings being, of course, contained within the scope of the present invention.

FIG. 1 shows in longitudinal section a part of an electrical machine with a suppressor device fitted.

FIG. 2 is a section on the line II—II of FIG. 1, the suppressor device having been removed.

FIG. 3 is a section, on the line III—III of FIG. 4, of a suppressor device according to the invention.

Figure 4:
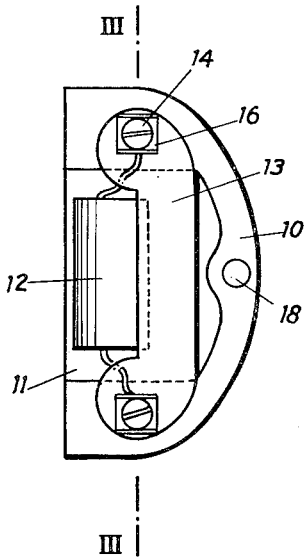
FIG. 4 is a plan view of this suppressor device.

In FIGS. 1 and 2 there is shown a part of the housing 1 of a machine which may be, for example, a portable electric tool, enclosing an electric motor 2, the shaft 3 of which is journalled at one end in a ball bearing 4. The rotor 5 of the electric motor is supplied with current through two brushes 6 carried in brush-holders 7 of electrically conducting material, e.g. brass, disposed symmetrically with respect to the axis of the rotor.

In accordance with the invention a contact nipple 8 of electrically conducting material, such as brass, is formed on or secured to each of the brush-holders 7. Moreover, opposite the brush-holders 7 the housing 1 of the machine is formed with an orifice 9 having a rabbeted edge which serves as a seating for the edge of a cover plate 10 the exterior profile of which merges with the exterior face of the housing 1. A recess 11 is formed in the interior face of the plate 10 to receive a suitable interference suppressor 12 which may be a capacitor, an inductance, or both. The suppressor 12 is held in place in the recess 11 by an insulating plate 13 fixed to the internal face of the cover plate 10 by screws 14 (FIGS. 3 and 4). The screws 14 are made of an insulating material if the cover plate 10 is made of conducting material and vice versa. To each of the two terminals of the suppressor 12 there is welded a short wire 15 surrounded by an insulating sheath; it passes through an orifice formed in the plate 13 and the bare end of the wire is wrapped around the screw 14. The bare end of the wire 15 is clamped between the insulating plate 13 and a conducting element or contact clip 16 consisting of a metal plate the edges of which have been bent back so that in section it is substantially U-shaped. The base of the U-shaped contact is slightly wider than the free end thereof. The distance between the screws 14 holding the contact clips 16 on the cover plate 10 is equal to the distance between the nipples 8 on the brush-holders 7.

In order to fit the suppressor 12 all that is necessary is to place the cover plate 10 in its seating 9 and to fix the cover plate to the housing 1 by means of a screw 17 passing through a hole 18 provided for this purpose in the cover plate 10. The contacts 16 are thus caused to engage with the nipples 8 so that the suppressor 12 connected by the wires 15 between the contacts 16 is thereby electrically connected in parallel with the brushes 6 in the electric circuit of the machine.

Thus the suppressor is incorporated as a removable unit into the machine. It can be removed, disconnected, replaced by another suppressor or put back without any other element in the machine being touched, including in particular the leads of the motor. Replacing the suppressor can be carried out without any special knowledge and without any tool other than a screw-driver. Finally, the length of the electric connection between the brushes and the suppressor is practically negligible so that no supplementary interference is caused.

Figure 6:
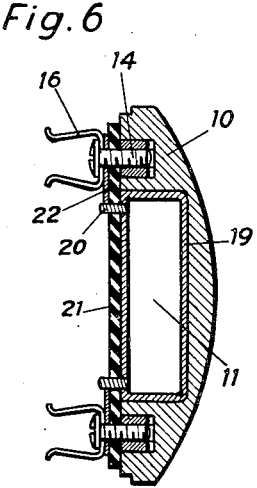
FIGS. 6 and 7 are sections taken on the lines VI—VI and VII—VII, respectively, of FIG. 5.
Figure 5:
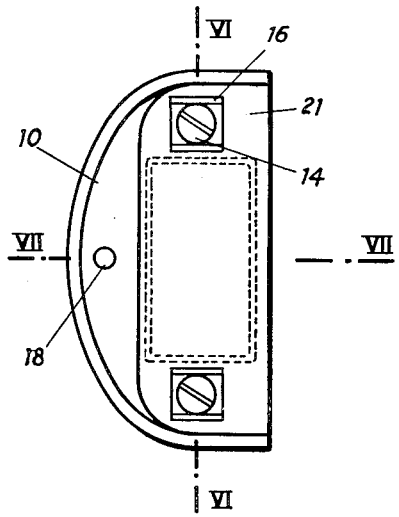
FIG. 5 shows, in plan view, a modification of the suppressor device according to the invention.
Figure 7:
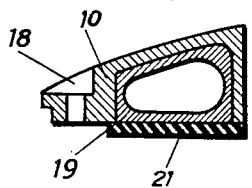

It should be noted that the device already described is intended for use with suppressors which as marketed are already enclosed in an insulating sheathing. According to a modification shown in FIGS. 5, 6 and 7, the housing of the machine and the cover plate, in particular, are made entirely of an insulating material and the cover plate itself serves as a sheathing and as a housing for the condenser and/or inductance forming the suppressor.

The unsheathed suppressor is introduced into a container 19 made of insulating material and its terminals are fixed to two electrically conducting elements 20 which protrude from the container 19. This container is placed in the recess 11 of the cover plate 10 where it is held in place by an insulating plate 21 closing the mouth of the recess and secured to the cover plate 10 by the screws 14. The conducting elements 20 pass through this plate 21 and are secured to small electrically conducting plates 22 through which the screws 14 pass. The plates 22 are clamped between the insulating plate 21 and the contact clips 16 which are adapted to engage the nipples 8 fixed on the brush-holders 7 of the electric motor.

This form of construction has the additional advantage of having a low manufacturing cost. Moreover, it affords a high degree of safety when the suppressor is in use.

It is obvious that modifications may be made in the forms of construction which have been described, without

What I claim is:

1. Electrical apparatus comprising, in combination, a housing having an aperture in the wall thereof, an electric motor disposed in said housing, a pair of brush-holders disposed in said housing in predetermined relationship to said motor and said aperture, a cover plate detachably carried on said housing to close said aperture, an interference suppressor having two terminals and being supported on said cover plate, a pair of contact members electrically connected to said terminals of said suppressor, respectively, and supported on said cover plate in positions enabling said contact members to engage conductively said brush-holders, respectively, when said cover plate is attached to said housing so as to close said aperture.

2. For electrical apparatus comprising an electric motor provided with a pair of brush-holders and enclosed within a housing having an aperture giving access to said brush-holders, in combination, a cover plate carrying an interference suppressor having two terminals, two electrical contacts carried on said cover plate and electrically connected to said terminals of said suppressor, respectively, and means for detachably securing said cover plate to said housing to close the aperture therein, said contacts being positioned for enabling the same to be in electrical engagement with said brush-holders, respectively, when said cover plate is secured to said housing so as to close said aperture.

3. Electrical apparatus comprising, in combination, an electric motor with an associated pair of brush-holders, two first electrical contact elements electrically connected to said brush-holders, respectively, a housing surrounding said motor and having an aperture disposed opposite said first contact elements, a cover plate, an interference suppressor mounted on said cover plate and having two terminals, two second electrical contact elements mounted on said cover plate, electrical connections between said second contact elements and said terminals of said interference suppressor, respectively, and means for detachably securing said cover plate to said housing over the aperture therein, said second contact elements being positioned for enabling the same to be detachably engaged with said first contact elements, respectively, when said cover plate is secured to said housing so as to cover said aperture.

4. Electrical apparatus comprising, in combination, an electric motor having two brush-holders, a housing for said motor formed with an aperture at a location opposite said brush-holders, two first electrical contacts electrically connected to said brush-holders, respectively, and directed towards said aperture, a cover plate having a recess in its inner face and adapted to constitute a closure for said aperture, an interference suppressor mounted within said recess and having two terminals, two second electrical contacts mounted on the inner face of said cover plate and positioned to engage said first contacts, respectively, when said cover plate is positioned to constitute a closure for said aperture, electrical connections between said terminals of said interference suppressor and said second contacts, respectively, and means for detachably connecting said cover plate to said housing to constitute a closure for said aperture.

5. Electrical apparatus comprising, in combination, an electric motor having two brush-holders, a housing for said motor formed with an aperture at a location opposite said brush-holders, two first electrical contacts electrically connected to said brush-holders, respectively, and disposed within said housing to extend towards said aperture, a cover plate having a recess in its inner face and adapted to constitute a closure for said aperture, an interference suppressor mounted within said recess and having two terminals, a plate secured to said inner face of said cover plate to retain said suppressor in said recess, two U-shaped electrical contact clips mounted on said inner face of said cover plate and positioned to detachably engage said first contacts, respectively, when said cover plate is positioned to constitute a closure for said aperture, electrical connections between said terminals of said suppressor and said contact clips, respectively, and means for detachably connecting said cover plate to said housing to constitute a closure for said aperture.

6. Electrical apparatus according to claim 5, wherein said cover plate has its outer face shaped to constitute a smooth continuation of the outer surface of said housing when said cover plate is detachably connected to the latter.

7. Electrical apparatus according to claim 5, wherein said cover plate is of insulating material and constitutes a sheathing for said suppressor.

8. For electrical apparatus comprising an electric motor having two brush-holders and a housing for said motor formed with an aperture at a location opposite said brush-holders, in combination a detachable interference suppressing unit comprising a cover plate adapted to constitute a closure for said aperture, an interference suppressor mounted on said cover plate and having two terminals, two electrical contacts mounted on said cover plate and positioned to extend through said aperture to engage conductively said brush-holders, respectively, when said cover plate is positioned to close said aperture, electrical connections between said terminals of said suppressor and said contacts, respectively, and means for detachably connecting said cover plate to said housing to close the aperture in the latter.

References Cited in the file of this patent

UNITED STATES PATENTS

| | | |
|---|---|---|
| 2,032,129 | Jackson et al. | Feb. 25, 1936 |
| 2,077,034 | Boerger | Apr. 13, 1937 |
| 2,294,723 | Boerger | Sept. 1, 1942 |